Patented Dec. 18, 1951

2,579,185

UNITED STATES PATENT OFFICE 2,579,185

AMINE SALT OF PENICILLIN

Alphonse P. Granatek, Syracuse, N. Y., assignor to Bristol Laboratories Inc., Syracuse, N. Y., a corporation of New York No Drawing. Application December 8, 1949, Serial No. 131,929

2 Claims. (Cl. 260—239.1)

The present invention relates to a new amine salt of penicillin more particularly 6-chloro-9-(4-diethylamino-1-methylbutylamino)-2-methoxy-acridine penicillin which is capable of exerting a repository antibiotic action, and is also useful for oral administration, and for external application.

The new penicillin salt of the present invention has the following formula

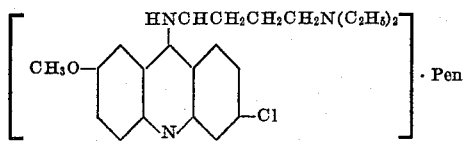 · Pen wherein Pen designates an acid penicillin radical or an active moiety thereof, capable of forming an addition salt with 6-chloro-9-(4-diethylamino-1-methylbutylamino)-2-methoxy-acridine.

A more comprehensive understanding of this invention is obtained by reference to the following example.

Example 0.94 gram of 6-chloro-9-(4-diethylamino-1-methylbutylamino)-2-methoxy-acridine hydrochloride is suspended in ether and made basic by addition of sodium hydroxide (NaOH) to make a first ether extract. The second ether extract is made by adding 1.32 grams of sodium penicillin G to phosphoric acid to ether and acidifying with phosphoric acid. The two ether solutions were dried with anhydrous sodium sulfate, filtered and then added together. The whole was then refrigerated and after 24 hours a precipitate was formed upon scratching. The slight orange crystalline precipitate was then filtered and dried in vacuum. Potency—668 u./mg.; solubility—3450 u./cc.

While the present invention has been described with particular reference to the 6-chloro-9-(4-diethylamino-1-methylbutylamino)-2-methoxyacridine penicillin addition salts of penicillin G it will be understood that 6-chloro-9-(4-diethylamino-1-methylbutylamino)-2-methoxy-acridine salts of other penicillins are also included within the scope of this invention. For instance, the natural penicillins such as penicillin G, F, X, dihydro F, and K, and mixtures of two or more of such penicillins, particularly mixtures containing at least 85% penicillin G, are included within the scope of the present invention.

Also, other salts of 6-chloro-9-(4-diethylamino-1-methylbutylamino)-2-methoxy acridine other than the hydrochloride may be employed. Examples of such salts of 6-chloro-9-(4-diethylamino-1-methylbutylamino)-2-methoxy-acridine phosphate, nitrate, hydrobromide, sulfate, citrate and tartrate. In general, any organic solvent soluble or water soluble salt may be employed.

It will be understood that the reaction can be carried out in water and organic solvents other than ether. Examples of such solvents are butanol, propanol, amyl acetate, methyl amyl acetate, isopropyl ether, mesityl oxide and methyl isobutyl ketone.

It will be understood that, without departing from the spirit of the invention or the scope of the claims, various modifications may be made in the specific expedients described. The latter are illustrative only, and not offered in a restricting sense, it being desired that only such limitations shall be placed thereon as may be required by the state of the prior art.

I claim:

1. A salt of penicillin and 6-chloro-9-(4-diethylamino-1-methylbutylamino)-2-methoxy-acridine.

2. A salt of penicillin G and 6-chloro-9-(4-diethylamino-1-methylbutylamino)-2-methoxy-acridine.

ALPHONSE P. GRANATEK.

REFERENCES CITED

The following references are of record in the file of this patent:

UNITED STATES PATENTS

| Number | Name | Date |
|---|---|---|
| 2,483,382 | Goldberg et al. | Sept. 27, 1949 |
| 2,493,625 | Goldberg et al. | Jan. 3, 1950 |
| 2,504,182 | Cooper | Apr. 18, 1950 |
| 2,527,810 | Goldberg et al. | Oct. 31, 1950 |

FOREIGN PATENTS

| Number | Country | Date |
|---|---|---|
| 604,563 | Great Britain | July 6, 1948 |
| 607,004 | Great Britain | Aug. 24, 1948 |

OTHER REFERENCES

Salivar et al.: "J. Am. Chem. Soc.," vol. 70, March 1948, p. 1287.

"Am. J. of Pharmacy," July 1945, p. 253.

Monash: "Science," vol. 107, October 17, 1947, p. 370.

"Proc. Staff Meet. Mayo Clinic," December 10, 1947, p. 567.

Destouches et al.: "Comptes Rendus," vol. 228, June 27, 1949, p. 2066.

Ballaro: "Ciencia e Investigacion," vol. 4, November 1948, pp. 481 and 482.

Merck Report CMR–M–XVb, March 31, 1944, published 1947, p. 1.

British Report CMR – Br. 234, CPS – 687; PB79,927, December 5, 1947 (published), pages 1 to 4.